United States Patent Office 3,316,902
Patented May 2, 1967

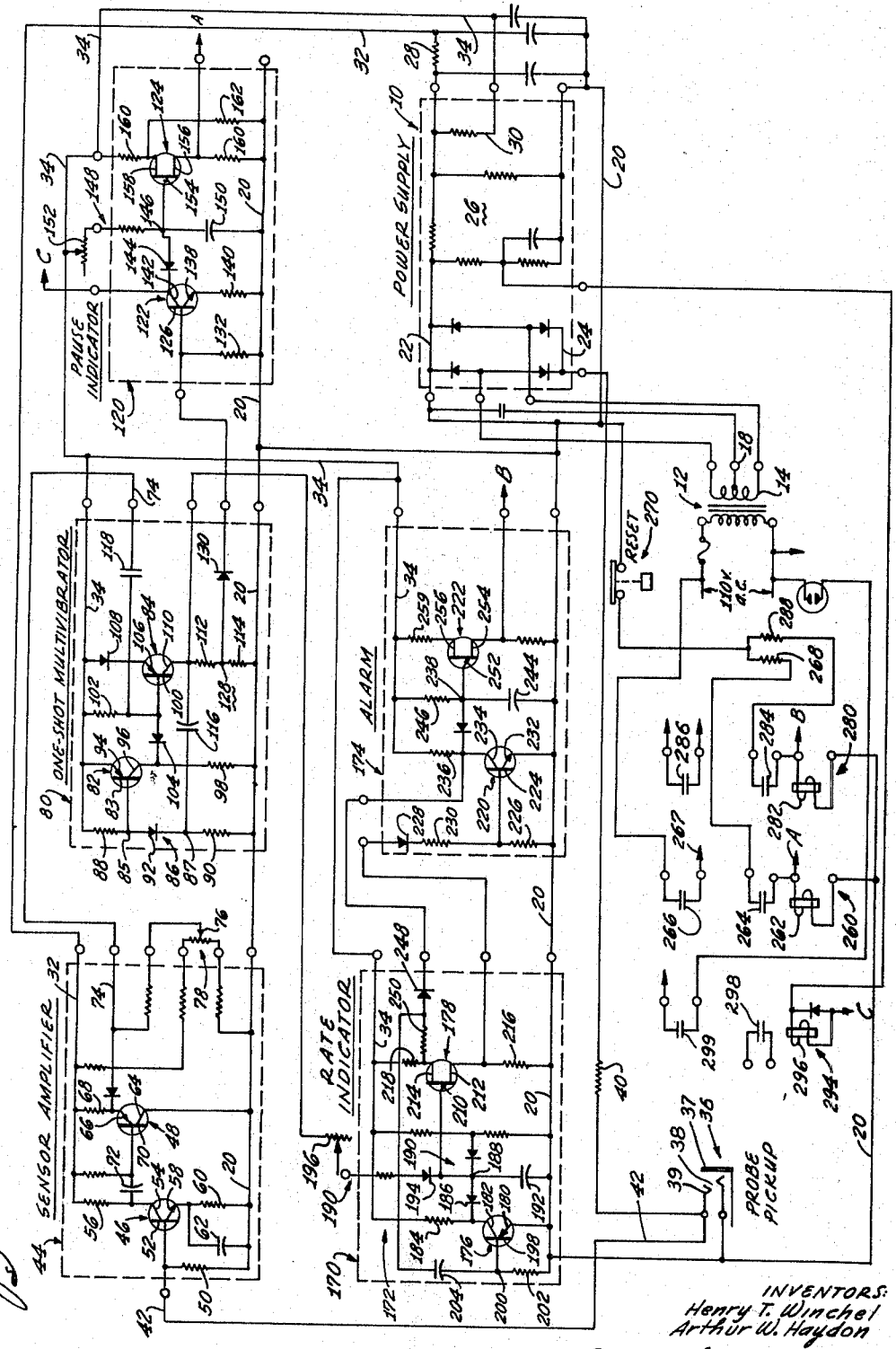

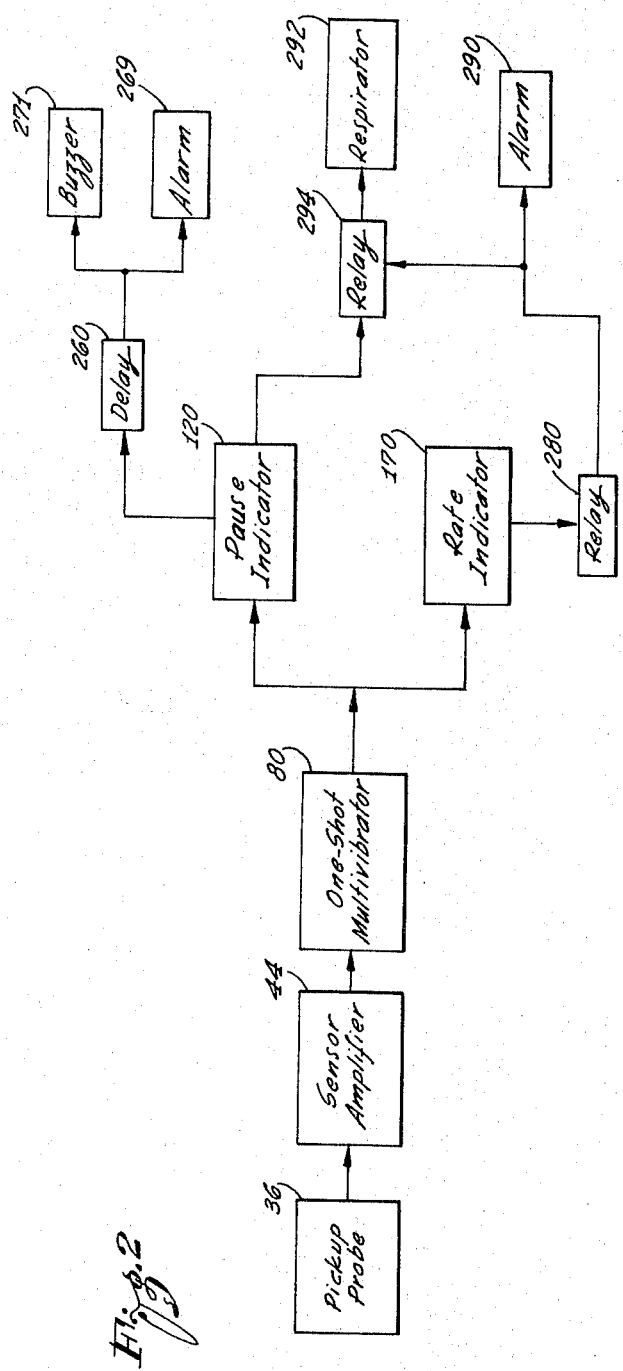

3,316,902
MONITORING SYSTEM FOR RESPIRATORY DEVICES
Henry T. Winchel, Los Angeles, Calif., and Arthur W. Haydon, Milford, Conn.; said Haydon assignor to Tri-Tech, Inc., a corporation of Connecticut
Filed Mar. 25, 1963, Ser. No. 267,703
12 Claims. (Cl. 128—145.5)

The present invention relates to respiratory means, and more particularly to means for monitoring the respiration of a person.

In new born infants and particularly in prematurely born infants, the reflexes and intelligence are frequently very poorly developed. In some cases, the undevelopment is such that an infant "forgets" to breathe or the reflex actions do not cause breathing for extended periods of time. In an aggravated case, the delay may be so long that the infant may actually suffocate without ever breathing again. In other cases, although the infant is breathing, the respiration rate is too low to insure an adequate supply of oxygen. In still other cases, although the infant has adequate mentality and reflexes to insure proper breathing, there may be other difficulties that may produce symptoms such as a low respiration or complete stoppage of the respiration. In any of the foregoing conditions, the infant is in critical danger and must be given immediate assistance to prevent his dying or permanent damage. Heretofore, the infant has had to rely entirely on an attendant such as a nurse visually observing his difficulties soon enough to provide effective assistance. Since it is not practical to continuously observe each and every infant at all times, it has been possible for an infant to be in a very serious condition or even dead before its difficulties are observed.

It is now proposed to provide means which will overcome the foregoing difficulties. More particularly, it is proposed to provide means which will continuously monitor the respiration of an infant. In the event of breathing difficulties, such as an excessively low respiration or complete stoppage of breathing, the difficulty will be instantly detected so that a suitable alarm may be given and/or appropriate corrective action instituted.

In order to accomplish this, a suitable pick-up probe is provided that will sense the respiration of an infant and provide a signal that is a function of the respiration. Additional means are provided that will monitor the respiration signal and measure the interval between successive inspirations and/or expirations and also measure the average rate over an extended interval such as one minute. In the event either of these measurements falls outside of preselected limits, an alarm will be instantly given so as to summon assistance. Another objective of this invention is to provide means whereby a respirator can be placed under the control of the infant so that its operation is synchronized with the infant's needs.

These and other features and advantages of the present invention will become apparent from reading the following detailed description of one embodiment thereof, particularly when taken in connection with the drawings wherein like reference numerals refer to like parts, and wherein:

FIGURE 1 is a block diagram of a respiration monitor embodying one form of the present invention; and FIGURE 2 is a block diagram of the monitor of FIGURE 1.

Referring to the drawings in more detail, the present invention is particularly adapted to be embodied in means for monitoring the respiration of a person such as a new born infant.

The monitor may be electrically energized by any suitable power source such as one or more batteries, etc. However, in the present instance, a power supply 10 is provided that may be interconnected with a suitable source of power such as a conventional 110 volt, 60 c.p.s. power line. The input of the power supply 10 includes a transformer 12 having a secondary winding 14 which will be effective to reduce the 110 volts down to a lower voltage such as 28 volts that is compatible with the various circuit components to be employed.

The secondary winding 14 may be interconnected with a rectifying circuit 16 that will convert the alternating voltage to a pulsating direct voltage. In the present instance, the rectifying circuit 16 includes a plurality of diodes that are arranged to form a full bridge type rectifier. The center tap 18 of the secondary winding 14 may be connected to ground. However, it is preferable for the center tap 18 to be connected so as to form a reference potential or a ground return line 20 that is "floating" or isolated from the chassis or anything that might contact a person. The first junction 22 will thus have a series of half wave pulses at 120 cycles per second and positive potential with reference to ground or the center tap 18 of the transformer 12. The opposite junction 24 will also have a series of half wave pulses of 120 c.p.s. of negative potential relative to ground on the center tap.

A filter circuit 26 may be connected to the junction so as to filter the 120 cycle half waves and provide a positive D.C. potential. The filtering means 26 may include two separate branches 28 and 30 having separate output lines 32 and 34. Each of these lines are decoupled from each other so as to produce a pair of independent sources of positive D.C. potential.

In order to detect the breathing of a person, any suitable respiratory pick-up means may be employed. Although there are a large variety of respiratory pick-up means, in the present instance, the pick-up means includes a probe 36 that may be mounted on the person and includes a transducer that will sense the flow of air. More particularly, in the present instance a thermister 38 is employed wherein the resistance will vary over an extended range as its temperature changes. The probe 36 is then constructed so as to retain the thermister 38 in one or more of the respiratory tracts of the person, for example, in one of the nostrils of the person, or the probe 36 may be retained in a nose mask.

When the thermister 38 is disposed in a respiratory tract such as the nostril and there is no respiration, the temperature of the thermister 38 will approach an ambient temperature which is closely related to the body temperature of the person. However, during inspiration, a charge of fresh air will be drawn through the tract so as to flow around and across the thermister 38. Normally, the temperature of this inspired air will be a few degrees cooler than the body temperature of the person and will be effective to cool the thermister 38. As the thermister 38 cools off toward the room temperature or incubator temperature, its resistance will increase. As soon as the inspiration of air is completed, and particularly during expiration, the temperature of the thermister 38 will rapidly rise back toward the ambient or body temperature. It may thus be seen that during each and every inspiration, the temperature of the thermister will momentarily drop and the resistance thereof will mometnarily increase.

The thermister 38 in the pick-up probe 36 may be connected with a plug or jack 37 that may be connected into a receptacle 39 in the monitor. The receptacle 39 is, in turn, connected with means for producing a signal that is a function of the temperature of the thermister 38. In the present instance, this is accomplished by means of one or more voltage dropping resistors 40 that are connected to the junction 24 in the bridge rectifier 16. This will be effective to impose a 120 cycles per second voltage across the thermister 38. Since the thermister 38 and the dropping resistors 40 are all connected in series, the voltage across the thermister 38 will be reduced from the voltage at the junction 24 by the ratio of the resistance of the thermister 38 to the total of the resistance of the thermister 38 and the dropping resistors 40. It may thus be seen that as the temperature and therefore the resistance of the thermister 38 fluctuates, the voltage across the thermister will also fluctuate and form a 120 c.p.s. voltage signal. This signal, among other things, will include a reference level that will be a D.C. or slowly varying component that is a function of the ambient temperature of the thermister 38. In addition, a pulse will be superimposed upon the D.C. components and it will be substantially coincident with the inspiration of air.

It should be noted that the amount of voltage across the thermister 38 must be reduced to a safe level. More particularly, to be safe, this voltage must be sufficiently low to eliminate the possibility of electrically turning or shocking the person or of starting a fire that would be aggravated by the large volumes of oxygen which may be present in or around the respiratory tract, especially if the infant is in an incubator and is being given oxygen. By way of example, this voltage may be on the order of about 0.7 volt R.M.S.

An output or flow signal line 42 may be interconnected with the junction between the thermister 38 and dropping resistors 40. The voltage between this line 42 and the ground reference line 20 will be a 120 cycles per second voltage signal. This signal as previously stated includes a D.C. or slowly varying reference level which will be a function of the ambient temperature and a pulse type component that will have a frequency that is identical to the respiration rate and substantially coincident with the inspiration of air.

The flow line 42 may be operatively interconnected with the input into any means such as a sensor amplifier 44 that is effective to improve the quality of the flow signal. The present sensor amplifier 44 includes a pair of transistors 46 and 48 that are connected in series as an emitter follower. The first transistor 46 has the base 52 thereof connected directly to the flow line 42 so as to receive the flow signal. A resistor 50 may be connected from the base 52 to the ground line 20 so as to, in effect, parallel the thermister 38. The collector 54 is connected to the first D.C. supply line 32 by means of a load resistor 56. The emitter 58 is connected to ground by means of a resistor 60 and condenser 62.

The second transistor 48 may have its collector 64 connected directly to ground line 20 while the emitter 66 is connected to the D.C. supply line 32 by a resistor 68. The base 70 is coupled to the collector 54 by means of an A.C. coupling condenser 72. An output line 74 may be provided that is connected to the emitter 66 by means of a diode and is connected to an adjustable center tap 76 in a voltage divider 78 that extends from the D.C. line 32 and the ground line 20.

It may be seen that this amplifier 44 will be effective to increase the amplitude of the flow signal. By adjusting the setting of the center tap 76 just the peak portions of the pulses corresponding to the inspiration of air may be picked off. In addition, by the proper choice of components, this circuit can be made to operate as a self-biasing circuit that will be effective to provide unequal biases for unequal ambient conditions. Thus, any D.C. components resulting from varying ambient conditions will be bypassed to ground. By way of example, the resistor 60 may be on the order of 10,000 ohms while the condenser 62 is on the order of 1,000 microfarads. This will heavily bypass the D.C. components to ground and form a self-biasing amplifier that is very stable and will adjust to the varying ambient conditions to which the thermister 38 is exposed.

The signal out of the sensor amplifier 44 will be a pulse that is substantially coincident with the inspiring of air and will include a 120 cycle per second component. In order to facilitate the use of this pulse and to remove any spurious components therefrom, a pulse shaping means may be employed. In the present instance, this means includes a so-called one-shot multivibrator 80 having a pair of transistors 82 and 84.

The first transistor 82 has the base 83 thereof connected to a junction 85 in a voltage dividing network 86 that extends from the D.C. supply line 34 to the ground line 20. This network 86 includes a pair of resistors 88 and 90 that are joined together by a diode 92. The emitter 94 of the transistor 82 is connected directly to the supply line 34 while the collector 96 is connected to the ground 20 by a resistor 98.

The second transistor 84 has its base 100 connected to the supply line 34 by a dropping resistor 102 and to the collector 96 of the first transistor 82 by means of a diode 104. The emitter 106 is connected directly to the supply line 34 by means of a diode 108 while the collector 110 is connected to ground by a pair of output resistors 112 and 114. The collector 110 is also connected back to the junction 87 in the voltage dividing network 86 by means of a condenser 116. This condenser 116 will not affect the D.C. potential created at the junction 85 in the network 86. However, the condenser 116 will be effective to couple a pulse, resulting from a change of voltage across the resistors 112 and 114, back to the voltage divider 86. This will produce a corresponding pulse to pass through the diode 92 to the junction 85. The base 100 of the second transistor 84 is coupled to the output 74 of the sensor amplifier 44 by means of a coupling condenser 118.

Normally, the various parameters of the multivibrator 80 will cause the potential at the junction 85 to be adequate to bias the transistor 82 into a conductive state and to bias the transistor 84 into a non-conductive state. Whenever an inspiration of air occurs, a pulse of negative going polarity will be applied to the base 100. The center tap 76 may be adjusted so that this pulse will be of sufficient magnitude to bias the transistor 84 into a conductive state. This will cause the voltage across the output resistors 112 and 114 to rise above the ground potential. This positive going voltage will be coupled through the condenser 116 back into the voltage divider 86 so as to cause the transistor 82 to be biased into a non-conductive state. The potential at junction 85 and on the base 83 of the transistor 82 will be maintained sufficiently high to bias the transistor 82 non-conductive only as long as the charge on the condenser 116 exceeds a predetermined amount.

As long as the transistor 82 is non-conductive, the potential of the base 100 of the transistor 84 will be determined by the ratio of the resistances 98 and 102. This will be sufficient to insure the transistor 84 being maintained conductive. As the condenser 116 discharges, the voltage at the junction 85 and on transistor 82 will gradually recover. When it reaches a sufficient potential, it will cause the transistor 82 to become conductive. When the transistor 82 conducts, this will increase the current flowing in resistance 98 and cause the base 100 of the transistor 84 to be again clamped to the potential of the supply line 34 whereby the transistor 84 will be cut off or non-conductive.

It will thus be seen that the potential across the output resistors 112 and 114 will be a series of squarewave or trigger pulses. The duration of the pulse will be controlled by the time constants of the discharging circuits for the condenser 116 and, therefore, the amplitude and time duration of the pulses will be substantially constant. One of these pulses will occur each and every time the person inspires or inhales a fresh charge of air of sufficient magnitude to lower the temperature of the thermister 38.

The instantaneous frequency of these pulses or conversely the period therebetween will thus be effective to indicate how long it has been since the person has taken a breath. Similarly, the average frequency of the pulse over a preselected interval such as one minute will be effective to indicate the respiration rate over that period of time. Accordingly, in order to determine whether or not a person is breathing and whether or not he is breathing at a satisfactory rate, means may be converted to the output resistors 112 and 114 of the one-shot multivibrator 80 for measuring the instantaneous frequency or period of the pulses and the average frequency of the pulses over a predetermined time interval.

Although these frequency measuring means may be of any desired variety, in the present instance, in order to determine the instantaneous frequency or period, a pause indicator 120 is employed. The present pause indicator 120 is a timer that is responsive to the time interval between the successive pulses and provides a signal that indicates when the time interval between pulses exceeds a predetermined amount. Although there are numerous means for accomplishing this, in the present instance, a timing circuit is employed that includes a pair of transistors 122 and 124.

The first transistor 122 has the base 126 thereof connected directly to junction 128 between the output resistors 112 and 114 by means of a diode 130 so as to receive the trigger pulses. In addition, the base 126 is connected to the ground line 20 by a resistor 132. The emitter 138 is connected to the ground line 20 by a resistor 140. The collector 142 is connected by means of a diode 144, to the junction 146 in a dividing network 148. This network 148 includes a condenser 150 that extends from the junction 146 to ground and a variable resistance 152 that extends from the junction 146 to the supply line 34.

The second transistor 124 may be a semiconductor device such as a so-called "uni-junction transistor." Such a transistor is a three element device having an emitter 154, a first base 156 and a second base 158. The emitter 154 is connected directly to the junction 146 so that the emitter 154 will be maintained at the same potential as the upper side of the condenser 150. The first base 156 is connected to ground by means of a resistor 160. The second base 158 is connected to the junction in the center of a resistive voltage divider having a pair of resistors 162 and 164 that extend from the supply line 34 to ground line 20.

Normally, the base 126 is held at ground potential and the first transistor 122 is biased into a non-conductive state. The condenser 150 in the network 148 will thus be free to acquire a charge through the resistance 152. This charge will gradually approach the potential on the line 34 and in the process will reach a potential that is large enough to cause a current to flow through the first base 156. The rate at which the charging progresses, and therefore the period of time required for the base 156 to become conductive is controlled by the setting of resistance 152. Normally, this setting is chosen so that the time required for the base 156 to become conductive is equal to the maximum acceptable period of time that may occur between breaths.

Each time a pulse occurs across the resistor 114 it will raise the base 126 so as to cause the transistor 122 to become conductive. As soon as the transistor 122 conducts, the condenser 150 in the network 148 will rapidly discharge. When this trigger pulse ends the transistor 122 will again become non-conductive. The condenser 150 will no longer be bypassed and it will be free to again start charging toward the potential on the supply line 34. This charging and the corresponding increase in potential will continue until the next inspiration causes a pulse on the resistor to trigger the transistor 122 conductive. It may thus be seen that the maximum potential that the charge on the condenser 150 and at the junction 146 can reach will be a function of the interval between the successive breaths. The resistor 152 is set such that during normal breathing the potential at the junction 146 will never rise sufficiently to bias the transistor 124 into a conductive state. However, in the event that the person stops breathing or for some other reason there is an abnormally long or dangerous time interval between the successive breaths, the pulse from the resistor 114 will not cause the transistor 122 to conduct in time to discharge the condenser 150 before the charge reaches a level effective to cause the base 156 to conduct. As soon as the base 156 conducts, a current will flow through the resistor 160 and a substantially instantaneous rise in the voltage across the resistor 160 will occur.

It may thus be seen that as long as the person takes a breath within a predetermined time interval, the potential across the resistor 160 will be substantially zero. However, the instant that an objectionable delay occurs between successive breaths a voltage rise will occur across the resistor 160 and indicate the existence of a potentially critically dangerous condition.

Suitable means may thus be connected across the resistor 160 so as to be responsive to the signal thereon for alerting an attendant such as a nurse or initiating any other action that may be appropriate for restoring respiration. In the present instance, a relay 260 is provided that has an actuating solenoid 262 which is effective when energized to close a first set of contacts 264 and a second set of contacts 266. One side of the solenoid 262 is connected to the ground line 20 while the other side is connected to the junction between the resistor 160 and the base 156. As a result, normally both ends of the solenoid 262 will be at ground level and the contacts 264 and 266 will be open. However, whenever the base 156 conducts and a pulse occurs across resistor 160, the solenoid 262 will be energized. This, in turn, will cause the contacts 264 and 266 to close.

The first set 264 are connected between the end of the solenoid 262 and the junction 22 in the power supply by means of a current limiting resistor 268 and a reset switch 270. This will form a holding circuit that will maintain the solenoid 262 energized and the contacts 264 and 266 closed until the reset switch 270 is opened.

The second set of contacts 266 is connected to one side of the 110 volt power supply. A conductor 267 extends to an alarm system. Closing of the contacts 266 as a result of a failure to breath, will thus energize the alarm system. This alarm system may include a visual and/or audible alarm 269 such as a bell located so as to attract the attention of and alert a person such as a nurse to the critical condition. As a result, help will be summoned immediately even though the person is not under close observation. The alarm system may also include a buzzer 271 or similar device that is located adjacent the person. In the event the stoppage of breathing is a result of undeveloped reflex actions or intelligence, such as may occur in a new born infant, the sounding of the buzzer close to the person may be effective to startle the person and cause restoration of normal breathing.

To determine whether or not the respiration rate of the person is at a satisfactory level, the frequency of the pulses from the output of the one-shot multivibrator 80 may be measured. Although there are a large variety of means that are suitable for measuring the frequency and indicating when the rate is less than a predetermined amount, in the present instance, a rate indicator 170 is provided. This rate indicator 170 includes a first section 172 that is effective to "count" the trigger pulses from the one-shot multivibrator 80 and to provide an output pulse signal whenever a predetermined number of pulses have occurred. A second section 174 is also provided that is responsive to the output pulse signal from the first section and is effective to indicate when an abnormally long interval is required to count the predetermined number of pulses.

The first section 172 includes a pair of transistors 176 and 178 that are arranged to count the pulses. The first transistor 176 has the emitter 180 connected directly to ground while the collector 182 is connected to the D.C. supply line by means of a load resistor 184. The collector 182 is also connected, by means of a diode 186, to a junction 188 in a network 190 that extends from the ground line 20 to the output resistors 112 and 114 in the one-shot multivibrator 80. This network 190 includes a condenser 192, a diode 194 and a variable resistance 196.

The base 198 of the transistor 176 is connected to a junction 200 between a resistor 202 and a condenser 204 in a network that extends to the output from the second transistor 178. Normally, the potential at the junction 200 will be substantially ground level. As a result, the base 198 will be biased so as to maintain the transistor 176 non-conductive.

It may be seen that when the transistor 176 is conductive, the condenser 192 cannot accumulate a charge since a short circuit loop will be formed that will cause the charge to flow through the diode 186 and the transistor 176. However, when the transistor 176 is non-conductive, the condenser 192 will be able to accumulate a charge. Thus, each time that a trigger pulse occurs across the resistors 112 and 114, a charge will travel through the network 190 and be accumulated upon the condenser 192. Since the potential and time duration of the trigger pulses are constant, the charges that are accumulated will be predictable and will be determined by the setting of the variable resistor 196. It may thus be seen that by varying the setting of the resistor 196, it is possible to vary the number of pulses that are required to cause the charge on the condenser 192 to build up to a particular potential.

The second transistor 178 may be of the so-called unijunction variety having an emitter 210, a first base 212 and a second base 214. The first base 212 is connected to ground 20 by a resistor 216 while the second base 214 is connected to the supply line 34 by a resistor 218. The emitter 210 is connected to the junction 188 in the network 190. As a result, the potential on the emitter 210 will be controlled by the charge on the conduenser 192.

When the condenser 192 is discharged or has a charge with a potential that is less than a predetermined amount, the transistor 178 will be biased so that the base 212 will be cut off and non-conductive. As a result, the base 212 will be at ground potential. However, when the required number of pulses have occurred to cause the potential of the charge to build up beyond a particular level, the emitter potential will become large enough to bias the base 212. This will cause the potential of the base 212 and across the resistor 216 to rise above the ground level. It will thus be seen that the potential of the base 212 will form a signal that indicates the period of time required for a predetermined number of inspirations to occur.

The second section 174 which is effective to indicate whether or not the period required for the preselected number of pulses to occur may be any form of time. In the present instance, it is very similar to the pause indicator 120 and includes a pair of transistors 220 and 222.

The first transistor 220 has the base 224 thereof connected to ground by a resistor 226. The base 224 is also connected to the base 212 of the transistor 178 by means of a diode 228 and a resistor 230. The base 224 will be biased by the potential across the resistor 226 which will normally be ground potential and will keep the transistor 220 biased non-conductive.

The emitter 232 of the transistor 220 is connected directly to ground line 20 while the collector 234 is connected to the supply line 34 by a resistor 236. The collector 234 is also connected to the junction 238 in a dividing network by means of a diode 242. This network includes a condenser 244 that extends from the junction 238 to ground and a resistor 246 that extends from the junction 238 to the supply line 34. The collector 234 is connected to the condenser 204 by a diode 248 and to the base 214 of the transistor 178 by the diode 248 and a resistor 250.

The second transistor 224 may be a so-called "unijunction transistor" having an emitter 252, a first base 254 and a second base 256. The emitter 252 is connected directly to the junction 238 so as to be maintained at the same potential as the upper side of the condenser 244. The first base 254 is connected to the ground line 20 by means of a resistor 258 while the second base 256 is connected to the supply line 34 by a resistor 259.

Normally, the base 224 of the first transistor 220 will be at ground level and the transistor will be non-conductive. The condenser 244 in the network 240 will thus be free to acquire a charge having a potential that gradually approaches the potential on the line 34. The rate at which the potential increases and therefore the time required for it to reach a given potential will be a function of the setting of the resistor 246. During normal conditions, the charge on condenser 244 will be low enough to keep the base 254 of transistor 222 non-conductive. However, if the condenser is allowed to charge for an extended interval, the potential may reach a sufficient level to cause base 254 to become conductive. The period required for this to occur may be set by means of the resistor 246 to be equal to the interval over which it is desired to average the respiration rate. For example, it may be on the order of one minute.

The operation of these sections 172 and 174 may be summarized as follows. Initially, all of the transistors 176, 178, 220 and 222 are biased non-conductive. The trigger pulses representing inspiration will appear across the resistors 112 and 114. These pulses will be applied to the network 190 and will incrementally charge the condenser 192. After a preselected number of pulses, i.e., the minimum acceptable number of pulses for the period over which they are to be averaged, the potential of the charge on the condenser 192 will raise the potential of the emitter 210 enough to bias the base 212 of the transistor 178 into a conductive state. When this occurs, a positive pulse will occur across the resistor 216.

The pulse on the resistor 216 will be coupled through the diode 228 and resistor 230 onto the base 224 of transistor 220. This will raise the potential of the base 224 and cause the transistor 220 to conduct. The collector 234 will then become more negative. This will cause a negative pulse to be coupled through the diode 248 and condenser 204 to the base 198 of the transistor 176. This will bias the transistor 176 conductive for a sufficient interval to discharge the condenser 192 for the next cycle. At the same time, the base 212 of transistor 178 will be cut off. This will result in a discharge of condenser 192 so that a new charging cycle may be started.

As soon as the transistor 220 conducts, the condenser 244 will rapidly discharge and carry the junction 238 to ground potential. Immediately following this, the transistor 178 will again become non-conductive and the condenser 244 will no longer be by-passed. As a consequence, it will commence charging toward the potential on the supply line 34. This charging and the corresponding increase in potential will continue until the first section 174 again counts the required number of pulses and produces a pulse across the resistor 216.

It may thus be seen that the maximum potential of the charge on the condenser 244 and at the junction 238 will be a function of the interval required for the preselected number of inspirations to occur. The resistors and condensers are set such that if the respiration rate is in excess of a preselected minimum, the potential at the junction 238 will never rise sufficiently to bias the base 254 of transistor 222 into a conductive state.

However, in the event that the respiration rate is dangerously low, the period required for the section 172 to count the required inspirations will be so long that the potential of the charge on condenser 244 will rise to a sufficient level to cause the base 254 of transistor 222 to conduct. As soon as the transistor 222 becomes conductive, a current will flow through the resistor 258 and produce a substantially instantaneous rise in the voltage thereacross. It may be seen that the potential on the resistor 258 forms a signal that indicates the respiration rate is dangerously low, or dangerously high.

Suitable means may be connected across the resistor 258 so as to be responsive to the signal thereon for alerting an attendant such as a nurse or initiating any other action which may be appropriate for increasing the respiration rate to an accessible level. In the present instance, a relay 280 is provided that has an actuating solenoid 282 which is effective when energized to close a first set of contacts 284 and a second set of contacts 286. One side of the solenoid 282 is connected to ground while the other side is connected to the junction between the resistor 258 and the base 254. It will thus be seen that normally both ends of the solenoid 282 will be maintained at ground potential and the contacts 284 and 286 will be opening. However, when the base 254 becomes conductive and a pulse appears across the resistor 258, the solenoid 282 will be energized. This, in turn, will cause the contacts in both sets to close.

The first set of contacts 284 is connected between the end of the solenoid 282 and the re-set switch 270 by means of a current limiting resistor 288. This will form a holding circuit that will be effective to maintain the solenoid 282 energized and the contacts in both sets closed until such time as the re-set switch 270 is manually opened.

The second set of contacts 286 may be intercconnected with a suitable alarm system. This alarm system may include an audio and/or visual device such as a bell alarm 290 described above. Thus, in the event of an excessive drop in the respiration rate, an alarm will be given which will be effective to instantly summon a person such as a nurse whereby assistance will be immediately rendered.

In addition, it may be desirable to automatically provide mechanical assistance in the form of a respirator 292 or other means that assist inhalation in increased quantities or otherwise supplement the natural respiration. In this event, an additional relay 294 may be provided which has a solenoid 296 with one side thereof connected to the collector 142 in the transistor 122. It will be remembered that each and every time a breath is taken, this transistor 122 will be biased conductive and, accordingly, the collector 142 will become more negative than the potential on the supply line 34. The other side of the solenoid 296 is interconnected with the power supply 10. It will thus be seen that each and every time the person takes a breath, the solenoid 296 will be energized and, as a consequence, the contacts 298 and 299 actuated thereby will close. These contacts may be interconnected with the contacts in the second relay 280. Thus, in the event the respiration rate is depressed and relay 280 is energized, each time air is inspired the relay 294 will be actuated so as to cause the respirator 292 to supplement the flow of inspired air, by, for example, momentarily increasing the pressure of the air going into the respiration system. Thus, although the respiration rate may be objectionably low, the overall inspiration of air will be maintained at an acceptable level. Of course, the percentage of oxygen can be increased by well known means but, since too high a percentage of oxygen has been found to be damaging, the control of volume and/or pressure of inhaled air by the infant with each breath, has proven more successful, especially when such "assistance" in breathing is placed directly under the control of the infant by means of the above described electronic sensing and triggering system connected to a respirator. It has, in fact, been found that unless the infant does have control over the start of each breath, artificial assistance in breathing is unsuccessful. Thus, synchronizing of the operation of the respirator with the infant's own attempts to breath is of paramount importance.

While only a single embodiment of the present invention is disclosed, it will be readily apparent to persons skilled in the art that numerous changes and modifications may be made thereto without departing from the spirit of the invention. Accordingly, the foregoing disclosure including the drawings and description thereof are for illustrative purposes only and do not limit the scope of the invention which is defined only by the claims that follow.

What is claimed is:

1. A respiration monitor of the type described for monitoring the respiration in a respiratory tract of a person, including:
   pick-up means constructed to be disposed in the respiratory track of a person whose respiration is to be monitored,
   a transducer disposed in said pick-up means and having variable electrical characteristics and responsive to said respiration of said person to vary its electrical characteristics each time the person breathes,
   first means operatively interconnected with said transducer and responsive to said electrical characteristics for providing a first signal that has a frequency substantially identical to the frequency of the respiration of said person,
   second means operatively interconnected with said first means and responsive to said first signal to indicate when the frequency of said respiration is less than a particular amount,
   respiratory means for supplementing the respiration of the person, and
   third means operatively coupled to the respiratory means and to the second means for obtaining an operation of the respiratory means when the second means indicates that the frequency of the respiration is less than the particular amount.

2. A respiration monitor of the class described for monitoring the respiration in a respiratory tract of a person, including:
   pick-up means constructed to be disposed adjacent a person for sensing the respiration of said person and for providing a sequence of first signals at a frequency dependent upon the frequency of respiration of said person,
   second means operatively interconnected with said pick-up means and responsive to said sequence of first signals to provide a pair of signals with a first one of said signals having characteristics dependent upon the average frequency of said first signal over a particular period of time and with the other of said signals having characteristics dependent upon the instantaneous frequency of said first signals,
   means operatively interconnected with said second means and responsive to the first one of the signals in said pair for providing an output indication when the average frequency of the first signals during the particular time interval is less than a particular value, and
   means operatively interconnected with said second means and responsive to the other signal in said pair for indicating when the instantaneous frequency of the first signals is less than a particular value.

3. A respiration monitor of the type described for monitoring the respiration in a respiratory tract of a person, including:
   pick-up means constructed to be disposed on a person whose respiration is to be monitored,
   a transducer disposed in said pick-up means and responsive to said respiration of said person to provide variable electrical characteristics during each respiration, means operatively interconnected with said transducer and responsive to said variable electrical characteristics for providing a signal having a frequency substantially identical to the frequency of the respiration of said person, frequency responsive means operatively interconnected with said last means and responsive to said first signal to provide a pair of signals one of which has characteristics dependent upon the average frequency of said respiration over a particular period of time and the other of which has characteristics dependent upon the instantaneous frequency of said respiration, and means operatively interconnected with said frequency responsive means and responsive to each of the signals in said pair to provide an output indication whenever at least one of the signals in said pair has particular characteristics representative of deviations in the instantaneous or average frequencies from particular limits.

4. A respiration monitor of the class described for monitoring the respiration in a respiratory tract of a person, including:

a pick-up probe constructed to be disposed in the respiratory tract of said person, a transducer in said probe for disposition in the flow of air inspired through said tract, said transducer having an instantaneous resistance dependent upon the temperature of said inspired air, means operatively coupled to said transducer for producing a signal having particular characteristics dependent upon the resistance of the transducer and having ambient portions, amplifying means operatively interconnected with said transducer and effective to suppress the ambient portions of said signal and to amplify said particular characteristics to provide a trigger signal each time air is inspired, second means operatively interconnected with said amplifying means and responsive to said trigger signal to indicate when the frequency of said respiration is less than a particular value, respiratory means for supplementing the respiration of the person, and means operatively interconnected with the second means for obtaining an operation of the respiratory means when the second means indicates that the frequency of the respiration is less than the particular value.

5. A respiration monitor of the class described for monitoring the respiration in a respiratory tract of a person, including:

pick-up means for sensing the respiration of said person and for providing a first signal having a frequency corresponding to the frequency of the respiration of the person, amplifying means operatively interconnected with said pick-up means and responsive to said first signal to provide a series of trigger signals with each of the trigger signals in said series representing another respiration of the person, first storage means operatively interconnected with said amplifying means and responsive to said trigger signals to provide a first charge dependent upon the interval between successive trigger signals, first indicating means operatively interconnected with said first storage means to provide a first output indication whenever the first charge has a first particular value, second storage means operatively interconnected with said amplifying means and responsive to said trigger signals to provide a second charge dependent upon the amount of time required to count a particular number of trigger signals, and second indicating means operatively interconnected with the second storage means to provide a second output indication whenever the second charge has a second particular value.

6. A respiration monitor of the class described for monitoring the respiration in a respiratory tract of a person, including:

pick-up means for sensing the respiration of said person and for providing a first signal having a frequency corresponding to the frequency of the respiration of the person, amplifying means operatively interconnected with said pickup means and responsive to said first signal to provide a series of trigger signals with each of the trigger signals in said series representing a respiration of the person, counting means operatively interconnected with the amplifying means and responsive to said trigger signals to count a particular number of the trigger signals, means operatively interconnected with said counting means to indicate the time required to count a particular number of said trigger signals, and means operatively interconnected with the last named means and responsive to the indication from such last named means to provide an alarm when the indication exceeds a particular value.

7. In a respiration monitor of the class described for monitoring the respiration in a respiratory tract of a person, including:

a pick-up means constructed to be disposed adjacent a person for providing a sequence of first signals indicating the inspiration of air through the respiratory tract of said person, first means operatively interconnected with said pick-up means and responsive to said sequence of first signals to provide a second signal having characteristics dependent upon the frequency of said sequence of first signals, and means operatively interconnected with said first means and responsive to said first and second signals to supplement the natural inspiration of air through said tract by the person in response to said each of said first signals in said sequence whenever the second signal has characteristics representing a frequency below a particular value for the first signal.

8. A respiration monitor of the type described for monitoring the respiration in a respiratory tract of a person, including:

a pick-up constructed to be disposed in a respiratory tract of a person whose respiration is to be monitored, a transducer disposed in said pick-up means and having variable electrical characteristics responsive to said respiration of said person to change its electrical characteristics each time that air is inspired through said respiratory tract, first means operatively interconnected with said transducer and responsive to said electrical characteristics for providing a signal that is substantially coincident with said inspiration and has a frequency substantially equal to the frequency of respiration of said person, second means operatively interconnected with said first means and responsive to the frequency of said first signal to provide a second signal having characteristics dependent upon the frequency of the first signal, and means operatively interconnected with said first and second means and responsive to said first and second signals to supplement the natural inspiration of air through said respiratory tract by the person in response to each of said first signals whenever said second signal has characteristics representing a frequency less than a particular value for the first signal.

9. A respiration monitor of the class described for monitoring the respiration in a respiratory tract of a person, including:
  a pick-up probe constructed to be disposed in the respiratory tract of said person to provide a first signal having components dependent upon the flow of inspired air through said tract and substantially coincident therewith,
  amplifying means operatively interconnected with said pick-up probe to amplify said components in said first signal and to provide trigger signals when said components occur,
  signal means operatively interconnected with said amplifying means and responsive to said trigger signals to provide a third signal having characteristics dependent upon the average frequency of said trigger signals during a particular time interval, and
  respiratory means operatively interconnected with said amplifying means and said signal means and responsive to said trigger signals and said third signal to supplement a natural inspiration of air through said respiratory tract by the person each time one of said trigger signals occurs and said third signal has characteristics representing an average frequency less than a particular value for the trigger signals.

10. A respiration monitor of the class described for monitoring the respiration in a respiratory tract of a person, including:
  a pick-up probe constructed to be disposed in a respiratory tract of said person to provide a signal having components that occur substantially coincident with each inspiration of air through said respiratory tract by the person,
  first means operatively interconnected with said pick-up probe and responsive to said components to provide substantially squarewave trigger signals of uniform duration when said components occur,
  second means operatively interconnected with said first means and responsive to said trigger signals to provide a third signal having a magnitude dependent upon the average frequency of said trigger signals during a particular time interval, and
  respiratory means operatively interconnected with said first means and said second means and responsive to said trigger signals and third signal to supplement the natural inspiration of air through said respiratory tract by the person each time that one of said trigger signals occurs and said third signal has a particular magnitude.

11. In a respiration monitor of the class described for monitoring the respiration in a respiratory tract of a person and supplementing respiration, a combination including:
  a pick-up means constructed to be disposed adjacent a person for providing a first signal that commences with the inspiration of air through a respiratory tract of said person and terminates at the end of said inspiration,
  first means operatively interconnected with said pick-up means and responsive to said first signal to provide a second signal having a magnitude dependent upon the frequency of said first signal,
  second means to supplement the natural inspiration of air through said tract by the person, and
  third means operatively interconnected with said first and second means and responsive to said second signal and to the commencement and termination of said first signal to actuate said second means only during each of said first signals whenever the frequency of said second signal is below a particular value.

12. In a respiration monitor of the class described for monitoring the respiration in a respiratory tract of a person, including:
  pick-up means constructed to be disposed in a respiratory tract of the person whose respiration is to be monitored for providing a first signal indicating the inspiration of air through the respiratory tract of said person,
  first means operatively interconnected with said pick-up means and responsive to said first signal to provide a second signal having characteristics dependent upon the frequency of said first signal, and
  means operatively interconnected with said first means and responsive to said first and second signals to supplement the natural inspiration of air through said tract by said person in response to said first signal whenever the second signal has characteristics representing a frequency below a particular value for the first signal.

References Cited by the Examiner
UNITED STATES PATENTS

| | | | |
|---|---|---|---|
| 2,414,747 | 1/1947 | Kirschbaum | 128—142 |
| 2,442,462 | 6/1948 | Kirschbaum | 128—2 XR |
| 2,769,121 | 10/1956 | Rogoff | 340—239 |
| 2,831,181 | 4/1958 | Warner | 128—2 X |

RICHARD A. GAUDET, *Primary Examiner.*

C. F. ROSENBAUM, *Assistant Examiner.*